April 3, 1956 B. M. SMALLEY 2,740,827
INSULATOR BRACKET
Filed March 9, 1953
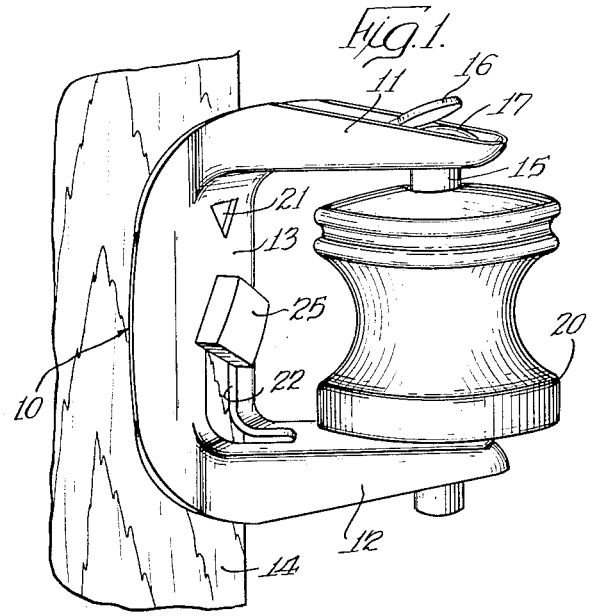
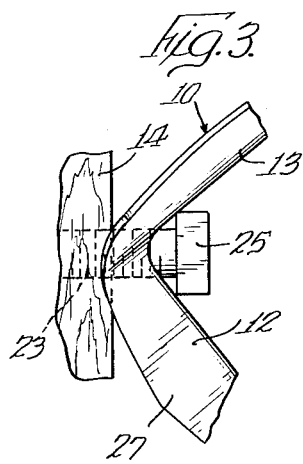
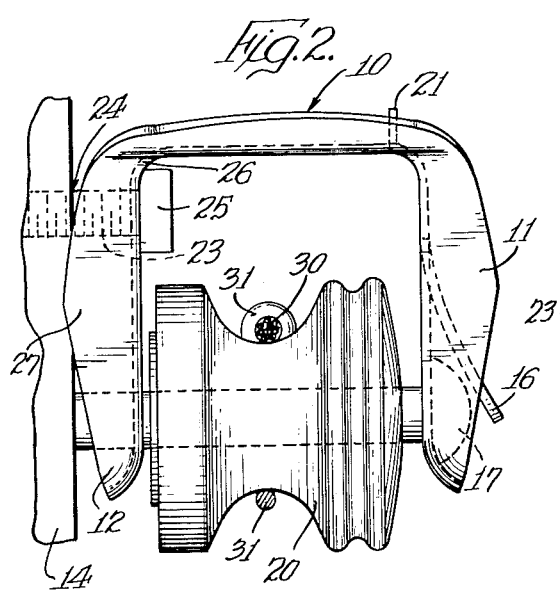
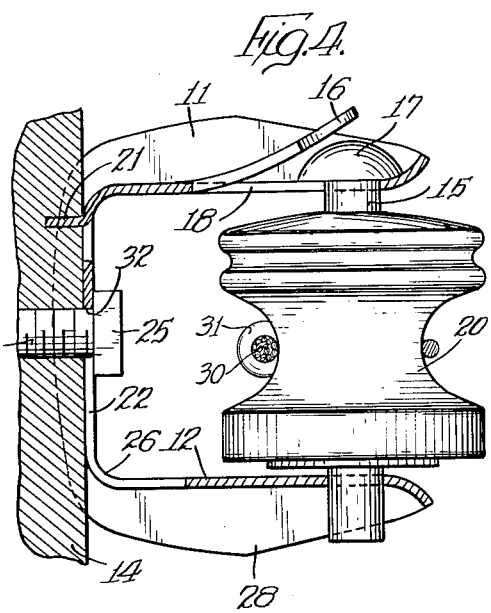
INVENTOR.
Burton M. Smalley
BY
Mason, Kolehmainen, Rathburn, & Wyss
Attys.

United States Patent Office 2,740,827
Patented Apr. 3, 1956

2,740,827

INSULATOR BRACKET

Burton M. Smalley, Highland Park, Ill., assignor to Joslyn Mfg. & Supply Co., Chicago, Ill., a corporation of Illinois Application March 9, 1953, Serial No. 341,242

4 Claims. (Cl. 174—162)

The present invention relates to an insulator bracket, and, more particularly, to an insulator bracket for use in secondary distribution circuits of electric power systems.

In electric power distribution systems it is customary to support the line wires on so-called secondary brackets or racks which are supported on the distribution poles. These brackets also serve to dead end the service drop in the case of a power takeoff to a residence or factory. In stringing these secondary runs it is considered best practice to string the line wire between the insulator and the pole instead of tying the line wire to the outside of the insulator so that if the tie wire or insulator fails the line wire will be confined in the bracket and will not be grounded. However, this arrangement calls for threading the line wire through the insulator and supporting the line wire in some manner until the desired sag between brackets is obtained and the line wire is tied in to the insulator. In many instances, particularly in the case of aluminum conductors, the wire may be mechanically damaged in sagging in these secondary runs.

In order to prevent damage to the line wire in stringing and sagging in the secondary line wires, certain arrangements heretofore proposed have employed a special insulator bracket arrangement in which the insulator is pivoted to a horizontal position and the line wire is pulled in over the insulator so that the insulator acts as a pulley or roller and minimizes damage to the line wire, the surface of the porcelain insulator being much smoother than the metal bracket itself even though the latter is galvanized. After the line wire is tied in to the insulator, the insulator is pivoted so that its axis is vertical which is the correct position for dead ending the service drop. While these prior art arrangements are, in general, suitable for their intended purpose, they all suffer from the disadvantage of being extremely complicated and expensive. Since these secondary brackets are used in large quantities it is particularly desirable to provide a bracket which can be manufactured in large quantities on a low cost per unit basis. Accordingly, it is an object of the present invention to provide a new and improved secondary bracket wherein the advantages of horizontal stringing are achieved while providing a bracket which is extremely simple in construction, may be readily manufactured at low cost, is simple to install and is reliable in its operation.

It is another object of the present invention to provide a new and improved secondary bracket of unitary construction wherein the insulator may be positioned either horizontally or vertically without the use of special hinged insulator pins or mounting brackets, and is held fixed in either position without the use of special clamps or the like.

Briefly, in accordance with one phase of the invention, there is provided a substantially U-shaped supporting member and a spool-like insulator rotatably mounted on the arms of the U-shaped member. A longitudinal slot is provided in the U-shaped member, this slot extending from the bight portion of the U-shaped member and around one corner thereof to a point on one of the arms of the member. The slot is adapted to receive the shank portion of a mounting bolt so that the member may be loosely mounted on a pole or other support with the axis of the insulator substantially horizontal, the bracket being retained in this position by engagement of the head portion of the bolt with the sides of the slot adjacent the slotted corner of the supporting member. After the line wire is sagged in and tied, the supporting member is then rotated to a position wherein the axis of the insulator is substantially vertical while the shank portion of the bolt is retained within the slot and is moved into the bight portion thereof, the member resting in the vertical position with the head portion of the bolt in engagement with the upper end of the slot.

The invention, both as to its organization and method of operation, together with further objects and advantages thereof, will best be understood by reference to the following specification taken in connection with the accompanying drawings in which:

Fig. 1 is a side elevational view, in perspective, of a secondary bracket embodying the features of the present invention and showing the insulator in a vertical position;

Fig. 2 is a side elevational view of the bracket of Fig. 1 showing the insulator in a horizontal position;

Fig. 3 is a fragmentary side elevational view of the bracket of Fig. 1 showing the manner in which the bracket is moved from a horizontal to a vertical position, and Fig. 4 is a side elevational view, partly in section, of the bracket of Fig. 1 taken along the center line thereof.

Referring now more particularly to the drawings, the secondary bracket of the present invention is illustrated therein as comprising a generally U-shaped supporting member, indicated generally at 10, which is provided with arms 11 and 12 of generally U-shaped cross section and a bight portion 13 which is curved to conform to the shape of a conventional mounting pole 14. The arms 11 and 12 carry at the ends thereof an insulator pin 15 which is positioned generally parallel to the bight portion 13 of the supporting member 10 and is loosely retained between the arms 11 and 12 by means of a tongue portion 16 which is struck up out of the arm 11 and retains the head 17 of the insulator pin 15 within the slot 18 provided in the upper arm 11 when the tongue portion 16 is lifted up. The insulator pin 15 rotatably mounts a spool-like insulator 20 which, in the position shown in Fig. 1, is seated upon the upper edge of the arm 12 and which, in the horizontal position shown in Fig. 2, may be rotated on the shank portion of the insulator pin 15 as a spool or roller. The supporting member 10 is also provided with a spur 21 which is struck out of the bight portion 13 of the member 10 and prevents the supporting member from rotating as it is being installed, as will be described in more detail hereinafter.

In order to provide a simple mounting arrangement whereby the supporting member 10 may be positioned with the axis of the insulator 20 in either a horizontal or a vertical position and whereby the supporting member may be readily rotated from the horizontal to the vertical position, there is provided an elongated mounting slot 22 in the U-shaped supporting member 10, the slot 22 extending from approximately the middle of the bight portion 13 of the member 10 and around one corner thereof to an intermediate point on the bottom arm 12 of the supporting member 10. The slot 22 is adapted to receive the shank portion 23 of a mounting bolt 24 and is sufficiently narrow that the head portion 25 of the bolt 24 engages the supporting member 10 along the sides of the slot 22 throughout the length thereof.

Considering now the installation and use of the secondary bracket of the present invention, the pole is first drilled to receive the mounting bolt 24 and the shank portion 23 of the bolt is inserted through the slot 22 and is secured to the pole by any suitable means, such as the conventional securing nut or the like, with the supporting member 10 in the position shown in Fig. 2 wherein the axis of the insulator 20 is in a substantially horizontal plane. It will be noted that with the supporting member 10 in the position shown in Fig. 2 the mounting bolt acts as the sole supporting means for the member 10 with the corner edges 26 of the supporting member adjacent the corner of the slot 22 in engagement with the upper edge of the head portion 25 of the mounting bolt 24. It will also be noted that the arm 12 of the supporting member 10 is provided with the relatively wide flanged portions 27 and 28 which are spaced apart by a considerable distance and engage the periphery of the pole 14 at spaced points thereon so that the supporting member 10 is prevented from turning while being loosely supported in the position shown in Fig. 2.

While the member 10 is in the position shown in Fig. 2 a line wire 30 is run in over the upper edge of the insulator 20, this insulator acting as a pulley or roller to prevent damage to the conductor as it is run in. When the desired sag between secondary brackets has been achieved the line wire 30 is secured, or tied in to the groove of the insulator 20 by means of the conventional tie wire 31. After the line wire has been run in and secured to the insulator 20 the supporting member 10 is then rotated to the position shown in Fig. 4 wherein the axis of the insulator 20 is in a substantially vertical position. As the supporting member 10 is rotated from a horizontal to a vertical position it is retained under the head portion 25 of the mounting bolt as the shank portion of the bolt is moved through the slot 22. The member 10 is supported in the vertical position by engagement of the shank portion 23 with the upper edge 32 of the slot 22 as is best illustrated in Fig. 4. It will be noted that when the mounting bolt is initially adjusted to the position shown in Fig. 2 so that the insulator is mounted in a horizontal position, sufficient clearance is provided between the head portion 25 of the mounting bolt and the periphery of the pole 14 to permit the supporting member 10 to be rotated from the horizontal to the vertical position without readjustment of the mounting bolt, as is most clearly illustrated in Fig. 3. It will also be noted that by providing a supporting member of generally U-shaped cross section the supporting member is prevented from twisting or turning while it is rotated from the horizontal to the vertical position. After the member 10 has been rotated to the vertical position the mounting bolt is tightened so that the spur 21 enters the pole and provides additional means for preventing the supporting member from turning or rotating after it is installed.

From the foregoing description it will be evident that the present invention provides an extremely simple secondary bracket arrangement wherein the insulator may be supported in the horizontal position while the line wire is being run in and may be rotated to the final vertical position by merely moving the right angle slot portion of the bracket under the head of the mounting bolt, the U-shaped cross section of the bracket insuring that the insulator does not turn or twist when positioned in either the horizontal or vertical position.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. A bracket construction for line wires comprising a generally U-shaped member arranged to be attached to a support, a pin extending between the arms of said U-shaped member in a direction generally parallel with the bight portion of said U-shaped member and spaced therefrom, a spool-like insulator mounted on said pin for rotation about the longitudinal axis of said pin, said U-shaped member having an elongated slot defined therein which extends partially into said bight portion and partially into one of the arms of said U-shaped member so as to extend in two planes disposed substantially at a right angle to each other, said slot being adapted to receive a mounting member therein for securing said U-shaped member to said support, said mounting member including a head portion wider than said slot and overlying portions of said member on either side of said slot, said U-shaped member being movable between one position wherein said axis of said pin is substantially horizontal and another position wherein said axis is substantially vertical by merely bodily rotating said member through approximately a right angle while said mounting member remains in said slot secured to said support, whereby said mounting member in one of said two positions of said U-shaped member is in the portion of said slot extending into said bight portion and in the other of said two positions of said U-shaped member is in the portion of said slot extending into said one arm.

2. The bracket construction of claim 1 wherein the end of said slot in the bight portion engages said mounting member when the axis of said pin is disposed in said vertical direction.

3. The bracket construction of claim 1 wherein when said axis of said pin is disposed in a horizontal direction the head portion of said mounting member engages the bight portion of said U-shaped member.

4. The bracket construction of claim 1 wherein said U-shaped member is of somewhat channel shape.

References Cited in the file of this patent

UNITED STATES PATENTS

| | | |
|---|---|---|
| 1,278,318 | Edsall | Sept. 10, 1918 |
| 1,766,254 | Kearney | June 24, 1930 |
| 2,300,674 | Johns et al. | Nov. 3, 1942 |
| 2,571,495 | Steinmayer | Oct. 16, 1951 |
| 2,610,818 | Ridgers | Sept. 16, 1952 |
| 2,650,263 | Steinmayer | Aug. 25, 1953 |